(12) United States Patent
Liang

(10) Patent No.: US 10,185,348 B2
(45) Date of Patent: Jan. 22, 2019

(54) JOYSTICK STRUCTURE AND REMOTE CONTROLLER

(71) Applicant: AUTEL ROBOTICS CO., LTD., Shenzhen, Guangdong (CN)

(72) Inventor: Zhiying Liang, Guangdong (CN)

(73) Assignee: AUTEL ROBOTICS CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 15/934,058

(22) Filed: Mar. 23, 2018

(65) Prior Publication Data

US 2018/0210485 A1 Jul. 26, 2018

Related U.S. Application Data

(63) Continuation-in-part of application No. PCT/CN2017/113195, filed on Nov. 27, 2016.

(30) Foreign Application Priority Data

Dec. 22, 2016 (CN) .................. 2016 2 1415686 U (51) Int. Cl.
*G05G 9/047* (2006.01)
*G05G 1/04* (2006.01)
(Continued)

(52) U.S. Cl.
CPC ............. *G05G 9/047* (2013.01); *A63H 30/04* (2013.01); *G05D 1/00* (2013.01); *G05G 1/04* (2013.01);
(Continued)

(58) Field of Classification Search
CPC ............ A63H 30/04; G05D 1/00; G05G 1/04; G05G 2009/04703; G05G 3/00; G05G 9/047; G08C 19/28
(Continued)

(56) References Cited

U.S. PATENT DOCUMENTS

2002/0105503 A1* 8/2002 Oueslati ................ G06F 1/1626
345/173
2006/0238505 A1* 10/2006 Ahlgren ................ G06F 3/0338
345/161
(Continued)

FOREIGN PATENT DOCUMENTS

CN 201906462 U 7/2011
CN 102207744 A 10/2011
(Continued)

OTHER PUBLICATIONS

Chinese Search Report dated Feb. 26, 2018; PCT/CN20171/113195.

*Primary Examiner* — Tony O Davis
(74) *Attorney, Agent, or Firm* — Ladas & Parry LLP (57) ABSTRACT

The present invention discloses a joystick structure, including: a joystick, which includes an insertion portion; and a cartridge, including a buckle portion, the cartridge being further provided with a hollow portion. The buckle portion is used to clamp the insertion portion when the joystick is inserted into the hollow portion. The insertion portion and the buckle portion are designed to be separated from each other in structure and the joystick is mounted on the cartridge when used. This is convenient for mounting and use. When the joystick does not need to be used, an external force is applied to pull the insertion portion out of the buckle portion. The separation design makes the joystick detachable from the cartridge, reduces the size and is convenient for storage. The present invention further provides a remote controller having the foregoing structure.

12 Claims, 8 Drawing Sheets

(51) Int. Cl.
*G05D 1/00* (2006.01)
*A63H 30/04* (2006.01)
*G08C 19/28* (2006.01)
*G05G 3/00* (2006.01)

(52) U.S. Cl.
CPC .............. *G08C 19/28* (2013.01); *G05G 3/00* (2013.01); *G05G 2009/04703* (2013.01)

(58) Field of Classification Search
USPC .................. 345/161, 156–157, 170–178
See application file for complete search history.

(56) References Cited

U.S. PATENT DOCUMENTS

| | | | | | |
|---|---|---|---|---|---|
| 2007/0262959 | A1* | 11/2007 | Gu | ......................... | G05G 9/047 345/161 |
| 2009/0112387 | A1* | 4/2009 | Kabalkin | ............. | G05D 1/0038 701/23 |
| 2010/0125366 | A1* | 5/2010 | Huang | ................... | A63H 30/04 700/275 |
| 2012/0092253 | A1* | 4/2012 | Irani | ..................... | G06F 1/1692 345/157 |
| 2012/0169597 | A1* | 7/2012 | Liotta | .................. | G06F 3/0338 345/161 |
| 2014/0083833 | A1* | 3/2014 | Desplaines | ............ | G05G 9/047 200/6 A |
| 2014/0247246 | A1* | 9/2014 | Maus | ..................... | G06F 3/044 345/174 |
| 2014/0253446 | A1* | 9/2014 | Petersen | ............... | G06F 3/0338 345/161 |
| 2016/0334785 | A1* | 11/2016 | Morrison | ............... | A63H 30/04 |
| 2017/0106274 | A1* | 4/2017 | Ramcheran | ............. | A63F 13/24 |
| 2017/0199521 | A1* | 7/2017 | Tang | ...................... | A63H 30/04 |
| 2018/0025518 | A1* | 1/2018 | Horie | .................. | G05D 1/0038 |
| 2018/0063434 | A1* | 3/2018 | Seol | .................... | H04N 5/23245 |
| 2018/0164803 | A1* | 6/2018 | Liang | .................... | B64C 39/024 |

FOREIGN PATENT DOCUMENTS

| | | |
|---|---|---|
| CN | 20688091 U | 8/2017 |
| CN | 206516054 U | 9/2017 |
| EP | 0982646 A2 | 3/2000 |

\* cited by examiner

JOYSTICK STRUCTURE AND REMOTE CONTROLLER

CROSS REFERENCE

The present application is a continuation in part of International Application No. PCT/CN2017/113195, filed on Nov. 27, 2017, which claims priority to Chinese Patent Application No. 201621415686.1, filed on Dec. 22, 2016 and entitled "JOYSTICK STRUCTURE AND REMOTE CONTROLLER", both of which are incorporated herein by reference in its entirety.

TECHNICAL FIELD

The present invention relates to the field of remote controller technologies, and in particular, to a detachable joystick structure and a remote controller.

RELATED ART

A growing number of electronic products such as gaming machines, unmanned aerial vehicle or model airplanes adopt remote controller technologies and are operated by using remote controllers. A remote controller is generally provided with a remote control joystick. However, an existing joystick is generally fixed and has a relatively large volume. Consequently, the joystick is inconvenient. In addition, the joystick leads to inconvenient folding when a remote controller has a foldable display; and the joystick is sometimes inconvenient to operate when the joystick is appropriately designed to be shorter.

SUMMARY

An objective of the present invention is to provide a remote controller and a joystick structure that has a simple structure and can be disassembled rapidly.

The present invention provides a joystick structure, including:

a joystick, the joystick including an insertion portion; and a cartridge, including a buckle portion, the cartridge being further provided with a hollow portion, where the buckle portion is used to clamp the insertion portion when the joystick is inserted into the hollow portion.

Further, the insertion portion includes a card slot provided along a circumferential direction of the joystick and the card slot is used to buckle the buckle portion when the buckle portion clamps the insertion portion.

Further, the buckle portion includes an abutting member, which is buckle-connected to the insertion portion; and an elastic member, sleeved outside the abutting member, where when an external tension force is applied to the joystick, the joystick presses against the abutting member, so that the elastic member deforms to cause the abutting member to slide out from the insertion portion and the insertion portion is detached from the buckle portion.

Further, the joystick further includes an operation handle, which is disposed at an end away from the insertion portion.

Further, the operation handle is pancake-shaped, cylindrical or elongated.

Further, a protruding block is disposed along a circumferential direction of the joystick and the cartridge is provided with a groove around an upper edge of the hollow portion, the shape of the protruding block matches that of the groove, so as to lock the protruding block in the groove.

Further, the joystick is provided with a groove along a circumferential direction and the cartridge is provided with a protruding block around an upper edge of the hollow portion, the shape of the protruding block matches that shape of the groove, so as to lock the protruding block in the groove.

Further, an outer surface of the cartridge is provided with a receiving groove for receiving the elastic member.

Further, the receiving groove is provided with a through hole and the abutting member is received in the through hole.

Further, the joystick structure includes a rotary pin disposed on the cartridge and opposite to the hollow portion, where the joystick drives the cartridge to rotate about the rotary pin.

The present invention further provides a remote controller, including a base and the joystick structure described above, the joystick structure being mounted on the base.

Further, the remote controller further includes a display screen, which is rotatably connected to the base.

Compared with the prior art, the present invention has the following beneficial effects:

The insertion portion and the buckle portion are designed to be separated from each other in structure and the joystick is mounted on the cartridge when used. This is convenient for mounting and use. When the joystick does not need to be used, an external force is applied to pull the joystick out of the cartridge. The separation design makes the joystick detachable from the cartridge, reduces the size and is convenient for storage.

The joystick structure is mounted on the remote controller of the present invention. When the joystick does not need to be used, the joystick can be disassembled. Especially for the remote controller further including a foldable display screen, the joystick structure can be directly disassembled, which is convenient and space-saving.

BRIEF DESCRIPTION OF THE DRAWINGS

To describe the technical solutions in the embodiments of the present invention or in the existing technology more clearly, the following briefly describes the accompanying drawings required for describing the embodiments or the existing technology. Apparently, the accompanying drawings in the following description show merely some embodiments of the present invention and a person of ordinary skill in the art may still derive drawings of other embodiments from these accompanying drawings without creative efforts.

DETAILED DESCRIPTION

To further describe the principle and structure of the present invention, the following describes preferred embodiments of the present invention in detail with reference to the accompanying drawings.

Figure 1:
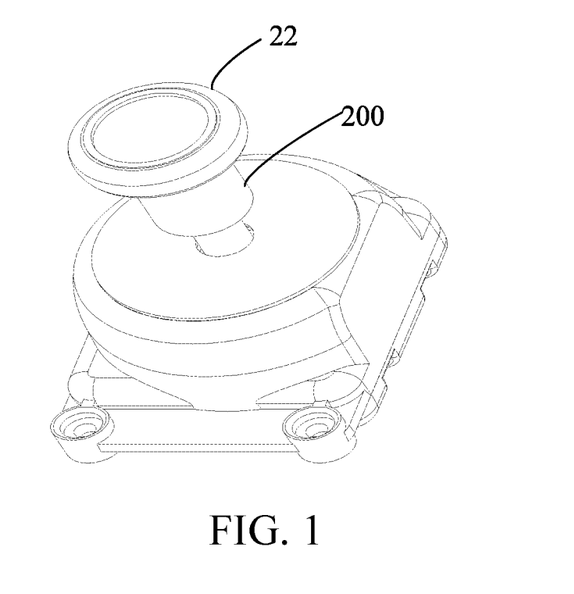
FIG. 1 is a stereogram of an entire joystick structure according to the present invention.
Figure 2:
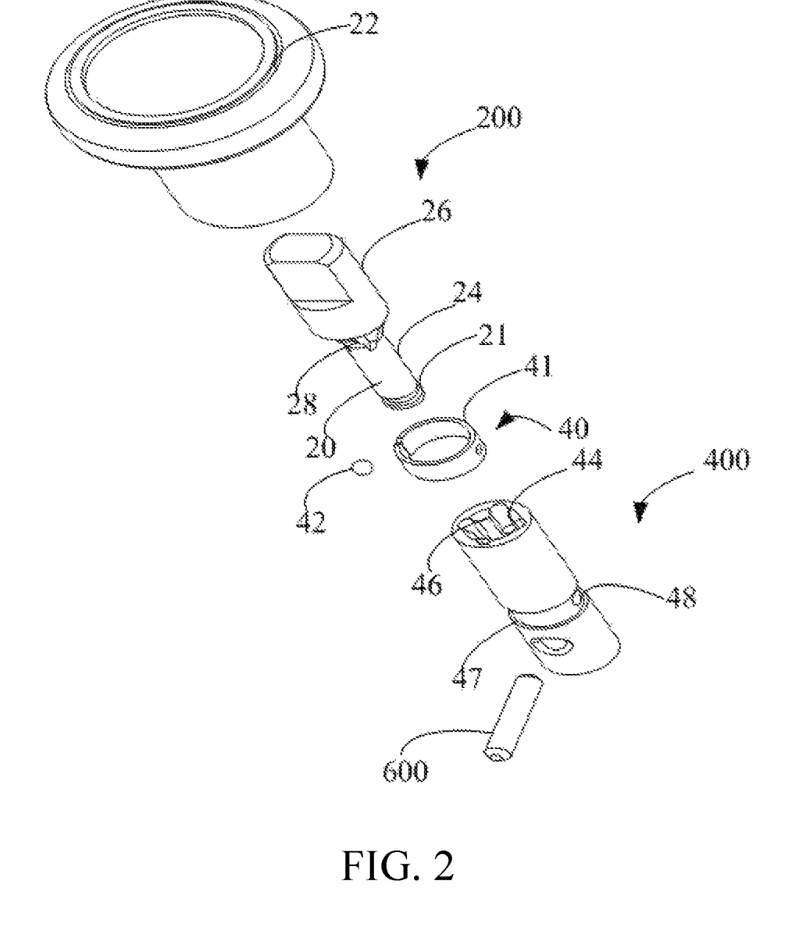
FIG. 2 is a schematic exploded view of a partial structure of FIG. 1.

Referring to FIG. 1 and FIG. 2, an embodiment provides a joystick structure, including a joystick 200 and a cartridge 400. The joystick 200 includes an insertion portion 20. The cartridge 400 includes a buckle portion 40. The cartridge 400 is provided with a hollow portion 44 and the buckle portion 40 is used to clamp the insertion portion 20 when the joystick 200 is inserted into the hollow portion 44.

The insertion portion 20 and the buckle portion 40 are designed to be separated from each other in structure and the joystick 200 is mounted on the cartridge 400 when used. This is convenient for mounting and use. When the joystick 200 does not need to be used, an external force is applied to pull the insertion portion 20 out of the buckle portion 40. The separation design makes the joystick 200 detachable from the cartridge 400, reduces the size and is convenient for storage.

In the embodiment shown in the figure, the joystick 200 further includes an operation handle 22. The operation handle 22 is disposed at an end away from the insertion portion 20. Herein, the operation handle 22 and the joystick 200 are separately designed. In another embodiment, the joystick 200 and the operation handle 22 may alternatively be integrally formed.

Specifically, the operation handle 22 may be set, according to usage habits of a user, to be pancake-shaped, cylindrical or elongated or to have a detachable connection to the joystick 200, making it convenience for the user to change the operation handle 22 to operation handles 22 of different shapes. In addition, to increase the comfort of the user, a rubber sleeve may further be sleeved over an outer surface of the operation handle 22. A material of the operation handle 22 is not limited and the operation handle 22 may be soft and removable plastic rubber sleeve or may be made of relatively hard rigid plastics.

The operation handle 22 is sleeved over the joystick 200 to cover the joystick 200. The joystick 200 is elongated and the joystick 200 includes a first end 24 and a second end 26 that are opposite to each other. The second end 26 is covered by the operation handle 22. In this embodiment, the first end 24 has a relatively small outer diameter and the second end 26 has a relatively large outer diameter. The insertion portion 20 is disposed at the relatively small first end 24. The insertion portion 20 includes a card slot 21 provided along a circumferential direction of the joystick 200. A central angle corresponding to the card slot 21 is less than or equal to a central angle corresponding to a circumference. That is, the card slot 21 may be an annular card slot 21 formed around a longitudinal circumference of the joystick 200 or may be a semi-annular card slot 21 whose longitudinal circumference is less than the circumference.

In addition, a protruding block 28 is disposed along the circumferential direction of the joystick 200. Specifically, the protruding block 28 is disposed at an intersection between the first end 24 and the second end 26. There may be one protruding block 28, or two protruding blocks 28 that are linearly distributed, or four protruding blocks 28 that are cross-distributed or six protruding blocks 28 that are distributed in a pozidriv type. In this embodiment, the protruding block 28 has a gradually ascending height from the first end 24 to the second end 26 and is inclined as a whole. In addition, an end face of the first end 24 of the joystick 200 is in a shape of a fat circular table. Certainly, a structure of the end face is not limited thereto and may be a semicircular table that slightly protrudes outward or of another shape.

Referring to FIG. 2, an upper part of the cartridge 400 is provided with the hollow portion 44 and the insertion portion 20 of the joystick 200 is completely received in the hollow portion 44. That is, the length of the insertion portion 20 is less than or equal to the depth of the hollow portion 44. A groove 46 is provided along around an upper edge of the hollow portion 44 and a quantity and the shape of grooves 46 match a quantity or the shape of protruding blocks 28 on the joystick 200. Likewise, there may be one groove 46, or two grooves 46 that are linearly distributed, or four grooves 46 that are cross-distributed or six grooves 46 that are distributed in a pozidriv type. In this embodiment, a bottom of and a side wall of the groove 46 also match the inclined protruding block 28. That is, the bottom of and the side wall of the groove 46 also has a corresponding degree of inclination. When the joystick 200 is mounted on the cartridge 400, the protruding block 28 is locked in the groove 46, to prevent the operation handle 22 from rotation and fix the direction of the operation handle, thereby improving precision of a remote control operation.

It may be understood that, in another embodiment, a groove may be provided along the circumferential direction of the joystick 200. Correspondingly, a protruding block matching the groove is disposed along the hollow portion 44 of the cartridge. In this way, when the joystick 200 is mounted on the cartridge 400, the protruding block may be locked in the groove, to fix the direction of the protruding block.

The cartridge 400 further includes a buckle portion 40. The buckle portion 40 includes an elastic member 41 and an abutting member 42. An outer surface of the cartridge 400 is provided with a receiving groove 47. The receiving groove 47 is used to receive the elastic member 41. A through hole 48 passing through the cartridge 400 is provided at a bottom of the receiving groove 47, so as to make the receiving groove 47 communicate with the hollow portion 44 by means of the through hole 48. The through hole 48 is used to receive the abutting member 42. It can be easily understood that, a quantity of the through hole 48 is not limited and may be one, two or three or more. The distribution of the through hole 48 is also not limited and the through holes 48 may be distributed in a centralized manner or may be determined according to the shape of the receiving groove 47.

The contractile elastic member 41 is disposed on the cartridge 400. In this embodiment, the elastic member 41 is locked in the receiving groove 47 and the elastic member 41 is an annular spring. In another embodiment, the elastic member 41 may alternatively be a U-shaped spring, an elastic silicone member or the like.

Figure 3:
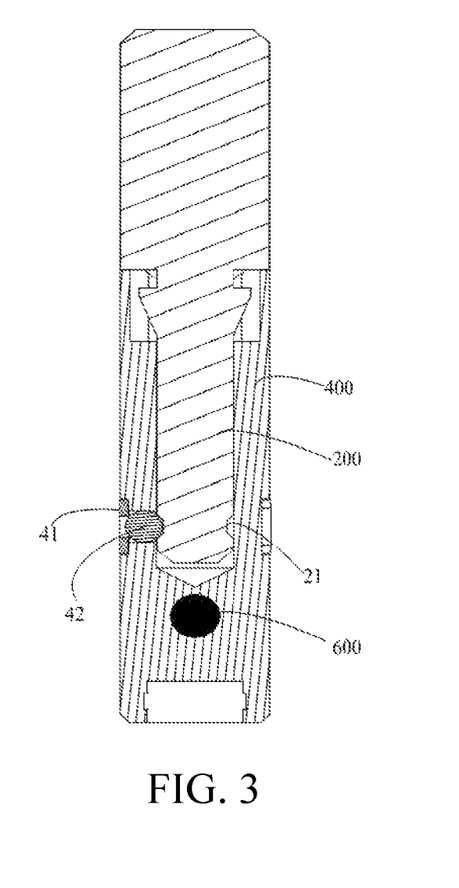
FIG. 3 is a sectional view of the joystick structure according to the present invention.
Figure 4:
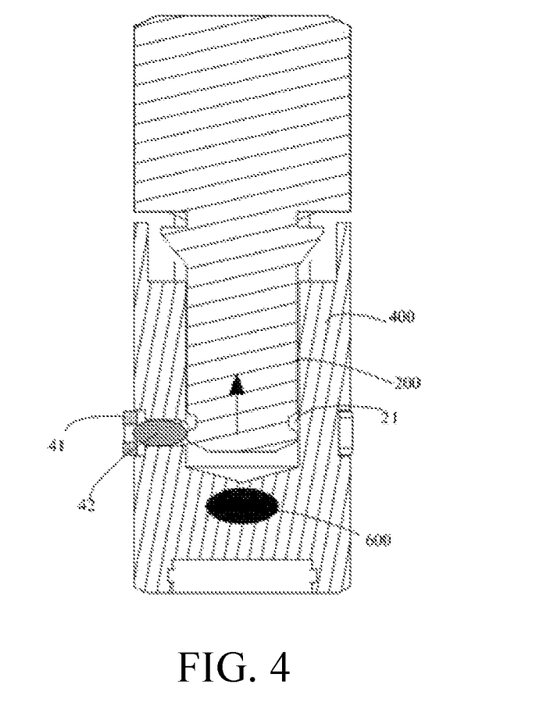
FIG. 4 is a sectional view of a joystick of the joystick structure when an external force is applied to the joystick.

With reference to FIG. 3 and FIG. 4, the abutting member 42 is locked between the elastic member 41 and the joystick 200 and the abutting member 42 may be locked in the card slot 21. Specifically, the abutting member 42 is slidably disposed in the through hole 48 and an end of the abutting member 42 is buckle-connected to the card slot 21.

The contractile elastic member 41 is sleeved outside the abutting member 42. When an external tension force is applied to the joystick 200, the joystick 200 presses against the abutting member 42, so that the elastic member 41 deforms to cause the abutting member 42 to slide out from card slot 22 and the joystick 200 is detached from the cartridge 400.

Specifically, in this embodiment, the abutting member 42 is a steel ball. It can be easily understood that, when no receiving groove 47 is provided on the outer surface of the cartridge 400, the elastic member 41 may be directly mounted on the outer surface of the cartridge 400 and the abutting member 42 is mounted in the through hole 48, as long as the abutting member 42 falls down into the card slot 21 on the joystick 200 during mounting and the abutting member 42 can slide out from the card slot 21 during disassembling when an external force is applied.

The joystick structure further includes a rotary pin 600. A lower part of the cartridge 400 is further provided with a through hole and the rotary pin 600 passes through the lower part of the cartridge 400. The joystick 200 drives, when rotated, the cartridge 400 to rotate about the rotary pin 600.

The following provides a description with reference to a disassembling method for a detachable remote sensing mechanism.

During disassembling, when an external force is applied to the operation handle 22 to pull the operation handle 22 out, the abutting member 42 locked in the card slot 21 is pressed and then presses against the elastic member 41, so that the elastic member 41 deforms until the abutting member 42 is completely pressed out of the card slot 21. The operation handle 22 is continuously pulled until the joystick 200 is completely detached from the cartridge 400.

During mounting, the operation handle 22 and the joystick 200 are sheathed in the cartridge 400. When a same external force is applied to the operation handle 22, the elastic member 41 presses against the abutting member 42 and the abutting member 42 is locked in the card slot 21 of the joystick 200. In this case, a particular clamping force exists to prevent the joystick 200 from loosing or falling out.

According to the foregoing joystick structure, during disassembling, an external force is applied to pull the joystick 200, the joystick 200 presses against the abutting member 42 and the abutting member 42 pushes the elastic member 41 to deform and spread outward, until the abutting member 42 completely slide out from the card slot 21 and the joystick 200 is completely pulled out. During mounting, the joystick 200 is kept pressed, until the elastic member 41 is completely locked in the card slot 21 and the joystick 200 is locked in the base 510. Such a structure is simple and can be rapidly disassembled without use of tools.

Figure 5:
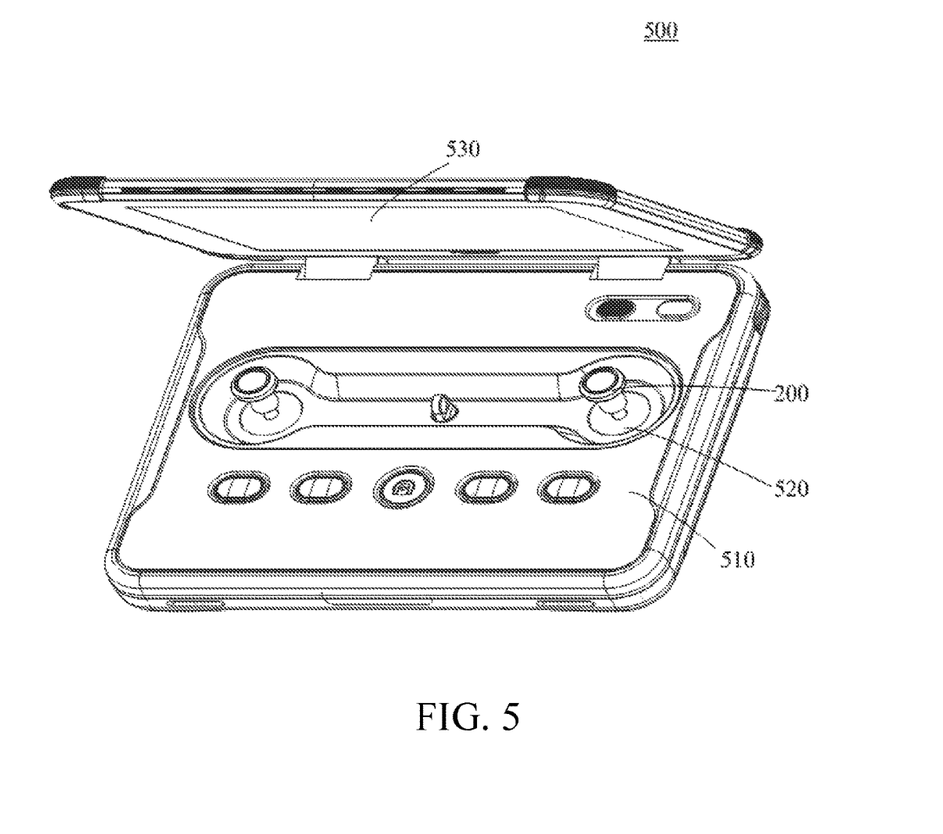
FIG. 5 is a stereogram of a remote controller according to the present invention.

Referring to FIG. 5, the present invention further provides a remote controller 500.

The remote controller 500 includes a base 510 and joystick structures described above. The joystick structures are disposed on the base 510. In this embodiment, the base 510 is provided with a receiving space 520 for mounting an operation handle 22 and a joystick 200. The joystick structures are respectively disposed on two sides: left and right sides of the base 510.

In this embodiment, the remote controller 500 further includes a display screen 530. The display screen 530 is connected to the base 510 and is rotatable relative to the base 510 until the display screen 530 completely covers the base 510.

When the display screen 530 of the remote controller 500 needs to be folded, the operation handle 22 and the joystick 200 may be first pulled out from a cartridge 400 and then placed in the receiving space 520 on the base 510.

The joystick structure is mounted on the remote controller of the present invention. When the joystick does not need to be used, the joystick can be disassembled. Especially for the remote controller further including a foldable display screen, the joystick structure can be directly disassembled, which is convenient and space-saving.

In another embodiment of the present invention, the present invention also provides a remoter controller. The remoter controller also comprises a base and a joystick structure disposed on the base. Which is different from the above mentioned embodiments is the structure of the joystick structure.

Figure 6:
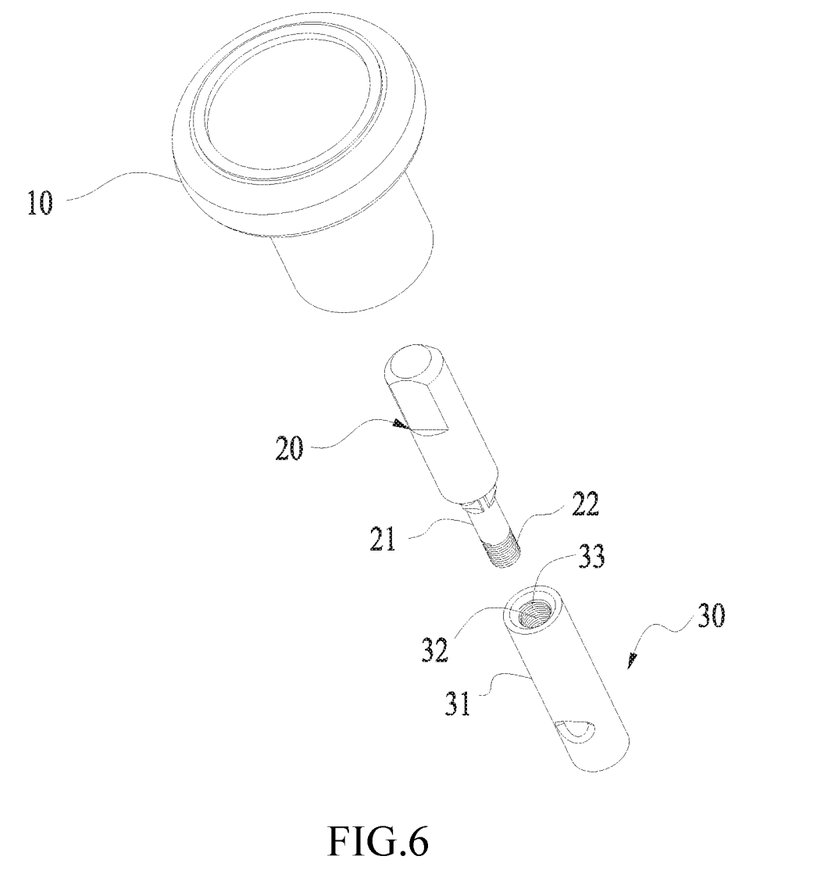
FIG. 6 is an exploded view of a joystick structure according to an embodiment of the present invention.

Referring to FIG. 6, in an embodiment of the present invention, the joystick structure may comprise an operation handle 10, a joystick 20 coupled to the operation handle 10 and a cartridge 30. In this embodiment, the joystick 20 and the cartridge 30 are detachably connected to each other by a thread structure.

The joystick 20 includes an insertion portion 21, and the thread structure includes an external thread 22 provided on an end of the insertion portion 21.

The cartridge 30 includes an annular wall 31 and a receiving hole 32 formed by the annular wall 31. The receiving hole 32 is used to receive the insertion portion 21. The thread structure further includes an internal thread 33 provided on an inner surface of the annular wall 31 and the inner surface faces to the receiving hole 32.

When assembling, just screwing the joystick 20 into the cartridge 30, and the assembling can be implemented which is very convenient.

Besides, the remoter controller can further including a receiving space provided on the base, when the joystick 20 is detached from the cartridge 30, the joystick 20 can be received in the receiving space which is space-saving and convenient for carry and storage.

It can be understood that, in another embodiment of the present invention, the joystick can be also provided with an internal thread alternatively. That is, in this embodiment, the joystick can include an annular wall and a receiving hole formed by the annular wall, and the receiving hole is used to receive the cartridge. The internal thread is provided on an inner surface of the annular wall that faced to the receiving hole. Correspondingly, the cartridge includes a main body and the main body is provided with an external thread coupled to the internal thread.

Figure 7:
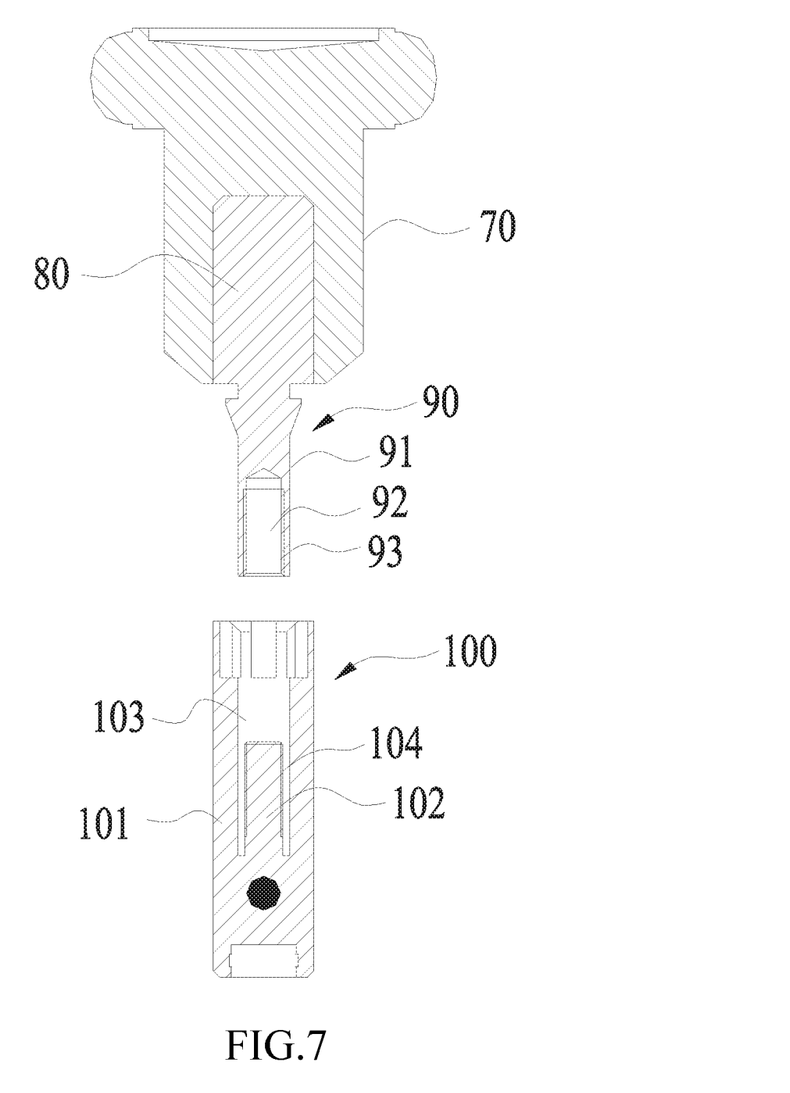
FIG. 7 is a sectional view of a joystick structure according to another embodiment of the present invention.

Referring to FIG. 7, in another embodiment of the present invention, the structure of the joystick structure is nearly the same with that of the above described embodiment. In this embodiment, the joystick structure also includes an operation handle 70, a joystick 80 coupled to the operation handle 70 and a cartridge 100 coupled to the joystick 80. The joystick 80 and the cartridge 100 are also detachably connected to each other by a thread structure.

Similarly, the joystick 80 also includes an insertion portion 90. The insertion portion 90 is provided with an annular wall 91 and a receiving hole 92 formed by the annular wall. The thread structure includes an internal thread 93 provided on an inner surface of the annular wall 91 that faced to the receiving hole 92.

Which is different from the previous embodiment is that, the cartridge 100 includes a main body 101, a connecting column 102 disposed in the main body 101 and a receiving room 103 formed by an inner surface of the main body 101 and an outer circular surface of the connecting column 102. The receiving room is used to receive the annular wall 91 of the insertion portion 90. The thread structure further includes an external thread 104 provided on the outer surface of the connecting column 102.

Figure 8:
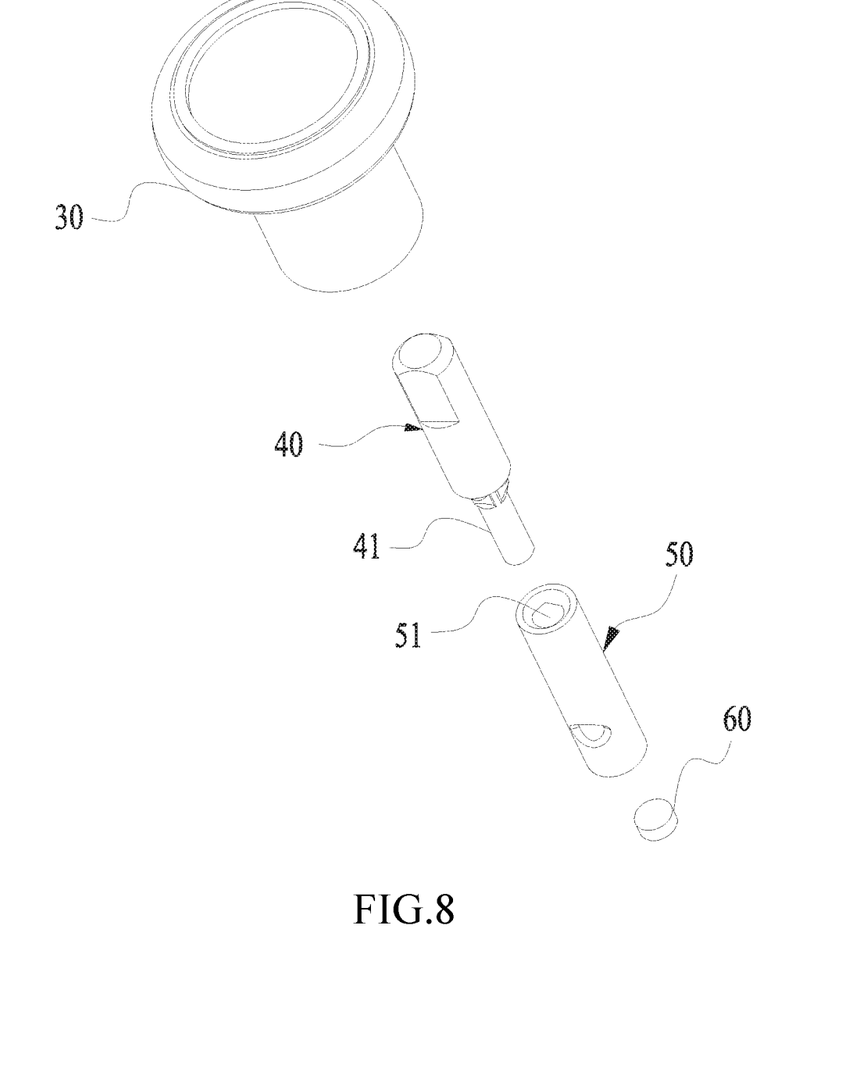
FIG. 8 is an exploded view of a joystick structure according to another embodiment of the present invention.

Referring to FIG. 8, in some embodiment of the present invention, the joystick and the cartridge are capable of being connected to each other by a magnetic member.

In this embodiment, the joystick structure includes an operation handle 30, a joystick 40 coupled to the operation handle 30, a cartridge 50 having a receiving hole 51 and a magnetic member 60 disposed in the receiving hole 51.

The joystick 40 includes an insertion portion 41 and at least a part of the insertion portion 41 is provided with metal material that is capable of attracting to the magnetic member 60. Or at least a part of the insertion portion 41 is provided with magnetic material whose polarity is reversed to the magnetic member 60. The at least a part of the insertion portion 41 may be the end of the insertion portion 41 or may be the outer circumferential surface of the insertion portion 41.

It should be understood that, the magnetic member also can be disposed on the end of the insertion portion and at least a part of the cartridge is provided with metal material that is capable of attracting to the magnetic member or provided with magnetic material whose polarity is reversed to the magnetic member. The at least a part of the cartridge may be the inner bottom surface that faced to the receiving hole.

In another possible embodiment of the present invention, the magnetic member even can include a first magnetic member disposed on the joystick and a second magnetic member disposed on the cartridge. The polarities of the first magnetic member and the second magnetic member are reversed.

What is described above is merely exemplary feasible embodiments of the present invention and is not intended to limit the protection scope of the present invention. Any equivalent modifications made to the structures based on the content of the specification and the accompanying drawings of the present invention shall be encompassed in the protection scope of the present invention.

What is claimed is:

1. A remote controller, comprising:
    a base; and
    a joystick structure disposed on the base, the joystick structure comprising a joystick having an insertion portion, and a cartridge provided with a hollow portion;
    wherein the cartridge comprises a buckle portion used to clamp the insertion portion when the joystick is inserted into the hollow portion;
    wherein the buckle portion comprises:
    an abutting member buckle-connected to the insertion portion; and
    an elastic member sleeved outside the abutting member, wherein the joystick presses against the abutting member in a state where an external tension force is applied to the joystick, so that the elastic member deforms to cause the abutting member to slide out from the insertion portion and the insertion portion is detached from the buckle portion.

2. The remote controller according to claim 1, wherein the insertion portion comprises a card slot provided along a circumferential direction of the joystick and the buckle portion is buckled in the card slot when clamping the insertion portion.

3. The remote controller according to claim 1, wherein the joystick further comprises an operation handle disposed at an end away from the insertion portion.

4. The remote controller according to claim 3, wherein the operation handle (22) is pancake-shaped, cylindrical or elongated.

5. The remote controller according to claim 1, wherein a protruding block is disposed along a circumferential direction of the joystick and the cartridge is provided with a groove around an upper edge of the hollow portion, a shape of the protruding block matches that of the groove, so as to lock the protruding block in the groove.

6. The remote controller according to claim 1, wherein the joystick is provided with a groove along a circumferential direction and the cartridge is provided with a protruding block around an upper edge of the hollow portion, a shape of the protruding block matches that of the groove, so as to lock the protruding block in the groove.

7. The remote controller according to claim 1, wherein an outer surface of the cartridge is provided with a receiving groove for receiving the elastic member.

8. The remote controller according to claim 7, wherein the receiving groove is provided with a through hole and the abutting member is received in the through hole.

9. The remote controller according to claim 1, further comprising a rotary pin disposed on the cartridge and opposite to the hollow portion, wherein the joystick drives the cartridge to rotate about the rotary pin.

10. The remote controller according to claim 1, further comprising a display screen, the display screen being rotatably connected to the base.

11. A remote controller configured to communicate with an unmanned aerial vehicle, comprising:
    a base with a receiving space; and
    a joystick structure disposed on the base, the joystick structure comprising a joystick and a cartridge;
    wherein the joystick and the cartridge are detachably connected to each other by a thread structure;
    wherein the joystick is configured to be accommodated into the receiving space when the joystick is detached from the cartridge;
    wherein the joystick comprises an annular wall;
    wherein a receiving hole is formed by the annular wall, the thread structure comprising an internal thread provided on an inner surface of the annular wall;
    wherein the cartridge comprises a main body and a connecting column disposed in the main body;
    wherein a receiving room is formed by an inner surface of the main body and an outer circular surface of the connecting column, the annular wall of the joystick being received in the receiving room;
    wherein the thread structure further comprises an external thread provided on the connecting column.

12. The remote controller according to claim 11, further comprising a display screen, the display screen being rotatably connected to the base.

* * * * *